United States Patent [19]

Olivier et al.

[11] Patent Number: 5,451,636
[45] Date of Patent: Sep. 19, 1995

[54] SOLID SHEARED POLYMER BLENDS AND PROCESS FOR THEIR PREPARATION

[75] Inventors: Errol J. Olivier; Robert T. Patterson; Peter N. Nugara, all of Baton Rouge, La.

[73] Assignee: DSM Copolymer, Inc., Baton Rouge, La.

[21] Appl. No.: 336,420

[22] Filed: Nov. 9, 1994

Related U.S. Application Data

[62] Division of Ser. No. 100,303, Aug. 2, 1993, Pat. No. 5,391,617.

[51] Int. Cl.$^6$ .................. C08L 23/16; C08L 51/04; C08L 51/06
[52] U.S. Cl. .................. 525/72; 525/240; 525/211; 525/197; 525/84; 525/80; 525/75; 525/74; 525/73; 525/71
[58] Field of Search .................. 525/72, 73, 74, 75, 525/80, 84, 197, 211, 240

[56] References Cited

U.S. PATENT DOCUMENTS

| | | |
|---|---|---|
| 3,468,979 | 9/1969 | Hamed et al. |
| 3,697,429 | 10/1972 | Engel et al. |
| 3,862,265 | 1/1975 | Steinkamp et al. |
| 4,088,713 | 5/1978 | Herman et al. |
| 4,507,515 | 3/1985 | Johnston et al. |
| 4,786,697 | 11/1988 | Cozewith et al. |
| 4,833,194 | 5/1989 | Kuan et al. |
| 5,130,359 | 7/1992 | Oksumi et al. |

FOREIGN PATENT DOCUMENTS 60-072948 4/1985 Japan .

*Primary Examiner*—Carman J. Seccuro, Jr.
*Attorney, Agent, or Firm*—Rockey, Rifkin and Ryther

[57] ABSTRACT

A blend and a process for producing that blend in which a high ethylene content ethylene-propylene polymer and a lower ethylene content ethylene-propylene polymer are subjected to simultaneous blending and shearing to reduce their molecular weights and molecular weight distribution and to yield a product that can be recovered as a solid using conventional plastic processing equipment. The sheared blend of polymers can function as a shear stable viscosity index improver with improved lower temperature properties.

18 Claims, 2 Drawing Sheets

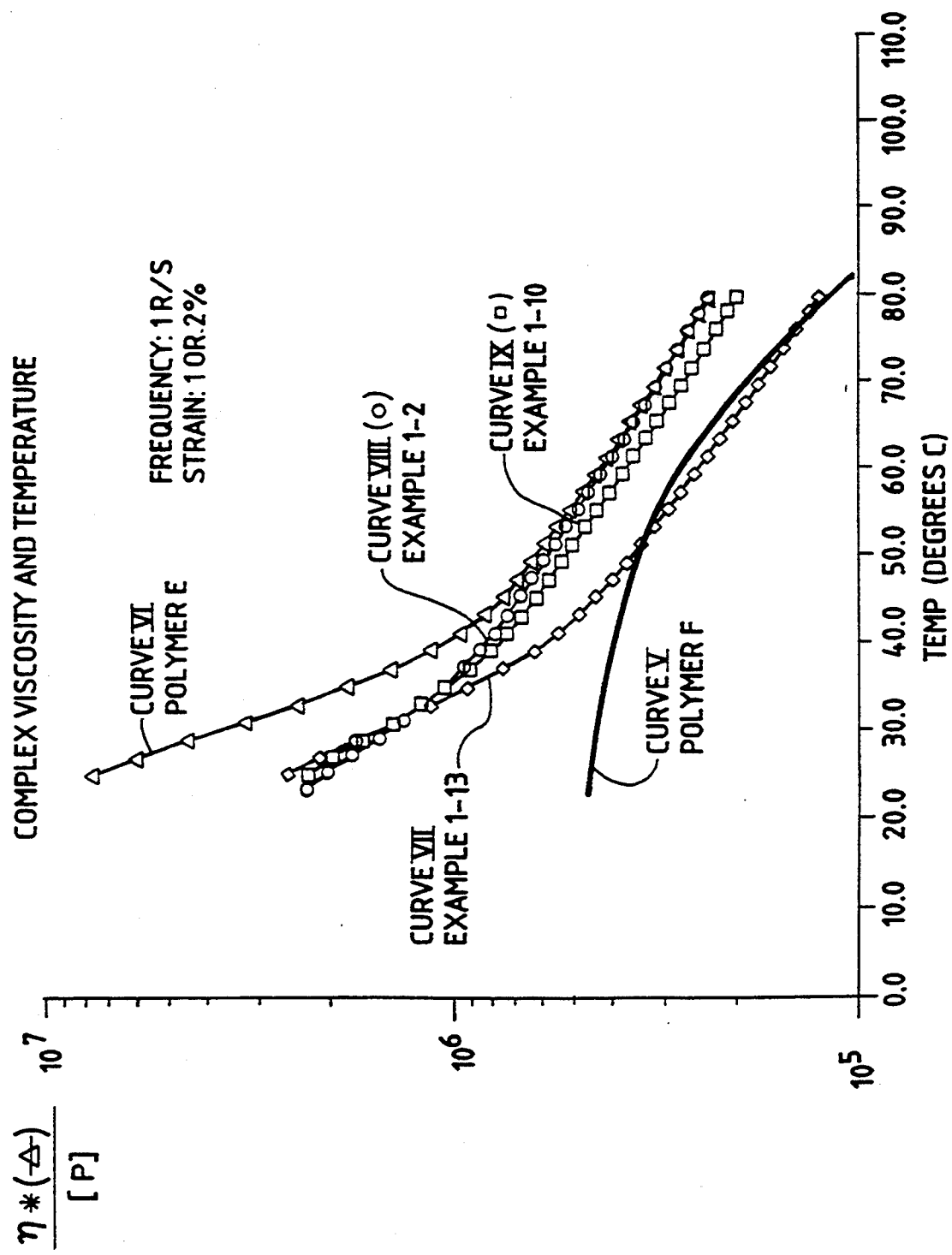

SOLID SHEARED POLYMER BLENDS AND PROCESS FOR THEIR PREPARATION

This is a divisional of application Ser. No. 08/100,303, filed on Aug. 2, 1993, now U.S. Pat. No. 5,391,617.

This invention relates to ethylene-propylene polymers and, more specifically, to blends of such polymers prepared by simultaneously blending and shearing the polymers to reduce their molecular weights and molecular weight distribution. The ethylene-propylene polymers of the present invention have unique properties which enable them to be processed in conventional plastic processing equipment.

BACKGROUND OF THE INVENTION

Ethylene-propylene polymers have long been known, and used for a variety of applications. For example, such copolymers, frequently referred to in the art as olefin copolymers or OCPs, have long been recognized as viscosity index improvers in engine lubricating oils. In addition to that application, such polymers have also been widely used as impact modifiers for plastic compositions.

As used in lubricating oil compositions, ethylene-propylene polymers have the ability to provide a high thickening contribution to the lubricating oil composition with which the OCP is mixed to provide increases in the viscosity index of the overall composition. Thickening power is often defined as the difference in the kinematic viscosities of a dilute solution of an OCP mixed with oil and the diluent oil. For example, an oil solution containing from 1 to 2 percent of an OCP which provides a thickening power of 6 to 7 centistokes measured at 100° C. generally indicates acceptable viscosity index improvement performance.

For a given class of polymers, the higher the molecular weight, the higher is the viscosity of a lubricating oil containing the OCP. However, higher molecular weight polymers exhibit a greater tendency to break down under the shear and high temperature conditions normally found in engine operation, frequently resulting in the loss of viscosity. Accordingly, viscosity index improvement often depends on the balance between the thickening contribution of the OCP and its tendency to degrade, referred to as shear stability. Shear stability is typically defined as a percent viscosity breakdown on shear under a standard set of conditions. A value below 30 percent viscosity breakdown in an OCP is generally an indication that the viscosity index improver OCP is shear stable as that term is understood in the art.

Another important characteristic required for a viscosity index improver is viscosity at low temperatures, which relates to the ease of engine cranking during start-up in cold climates. An ideal viscosity index improver exhibits a negligible viscosity contribution at low temperatures while providing a large viscosity contribution at engine operating temperatures. At the same time, an ideal viscosity index improver exhibits a low tendency to degrade, and consequently a high shear stability under engine operating conditions.

Accordingly, in formulating lubricating oils to satisfy the varying conditions desired, it has generally been the practice to select those polymers which provide at the lowest cost the best overall balance of properties including viscosity at performance temperatures, shear stability and low temperature viscosity.

In the past, the art has employed as viscosity index improvers, solid amorphous ethylene-propylene polymers. When selecting ethylene-propylene polymers, a molecular weight was chosen so that the polymer would provide shear stable viscosity index improvement after the oil dispersion process. These solid ethylene-propylene polymers were generally sheared during the oil dispersion, solution process resulting in lower molecular weight ethylene-propylene polymers. Oil concentrates of these lower molecular weight ethylene-propylene polymers were utilized as viscosity index improver packages by oil formulators. The sheared ethylene-propylene polymers that dissolved in oil, if isolated or prepared neat, were no longer stable solids but would exhibit extreme cold flow properties or exist as viscous oils. Such ethylene-propylene polymer viscosity index improvers as used in the prior art typically exhibit a Reduced Solution Viscosity or RSV, measured on a 0.05 weight % solution of the polymer in declain at 135° C. less than about 1.5 dl/g when they provide shear stable viscosity index improvement. Near that RSV limit, such ethylene-propylene polymers are difficult to recover and package using conventional rubber coagulation, recovery and packaging equipment. Those handling problems are even more severe as the RSV decreases, making recovery of such ethylene-propylene polymers at RSVs below 1.4 dl/g virtually impossible because the ethylene-propylene polymers show excessive cold flow or are essentially in the liquid phase.

Thus, the art has found that the use of ethylene-propylene polymers at RSVs of less than 1.5 dl/g require more elaborate techniques for the recovery of the polymers. In addition, such polymers may be sticky and therefore require special packaging for suitable containment.

Past efforts to handle such polymers as concentrated solutions in oil containing 5 to 20 percent by weight of the ethylene-propylene polymer viscosity index improver have met with limited success by reason of the disadvantages of requiring large amounts of oil in which the viscosity index improvers must be dispersed, and that in turn results in additional costs in transportation and, in some cases, additional tariffs by reason of the oil present even though the polymer is the component of interest.

The prior art has recognized the need to improve low temperature performance of such viscosity index improvers. For example, U.S. Pat. No. 4,507,515 describes blends of polymer compositions in which the major component has a low ethylene content and the minor component has a higher ethylene content, the minor component generally containing less than 10 percent by weight based on the weight of the blend. Similarly, U.S. Pat. No. 3,697,429 likewise describes the use of blends of high and low ethylene content polymers to achieve improvement in low temperature properties of a lubricating oil composition. One of the shortcomings of both prior art patents is that they do not describe any technique by which the major and minor components can be handled as solids.

In Canadian Patent No. 911792, there is disclosed a process for shearing high molecular weight polymers to produce a polymer having a desired molecular weight without altering the molecular weight distribution for use as a viscosity index improver. That Canadian patent does not, however, address the need for a solid shear stable polymer formed by shearing the polymer to reduce its molecular weight and its molecular weight distribution.

The present invention addresses the need to provide an oil-free or solid polymer having the capability of functioning as a shear stable viscosity index improver. According to the concepts of the invention, the ethylene-propylene polymer of the invention is the product of a simultaneously blended and sheared blend containing a high ethylene content ethylene-propylene polymer and a lower ehtylene content ethylene-propylene polymer whereby the physical properties of the sheared blend allows it to be recovered by means of conventional plastics processing equipment. The composition of the present invention in which the two components are simultaneously blended and sheared can thus be used as a viscosity index improver exhibiting improved low temperature properties as compared to (a) either of the two components used in preparing the blend and (b) blends of the same two components prepared by other blending techniques. The blends of the present invention find use not only as viscosity index improvers, but can also be used to improve the impact strength of various plastics such as polyamides or nylon, polyesters, polyolefins and like thermoplastic and thermosetting compositions, or as antiozonants for rubber/rubber blends.

It is accordingly an object of the present invention to provide a solid ethylene-propylene polymer blend which overcomes the shortcomings of the prior art.

It is a more specific object of the invention to provide an ethylene-propylene polymer blend and a method for its preparation which can be used to improve the viscosity index of lubricating oil compositions as well as an impact modifier for plastic compositions in which the blend is subjected to simultaneous blending and shearing to reduce the molecular weight and the molecular weight distribution of each of the ethylene-propylene polymer components.

It is furthermore an object of the present invention to provide a solid ethylene-propylene polymer blend which can be prepared in conventional plastic processing equipment.

These and other objects and advantages of the present invention will appear more fully by way of the following description.

SUMMARY OF THE INVENTION

The concepts of the present invention reside in a blend and a process for producing that blend in which a high ethylene content ethylene-propylene polymer and a lower ethylene content ethylene-propylene polymer are subjected to simultaneous blending and shearing to yield a product that can be recovered as a solid, using conventional plastic processing equipment. It has been unexpectedly found that the sheared blend can function as a shear stable viscosity index improver with improved lower temperature properties. The blend can also be used in other applications, notably including as an impact modifier for plastics, component in thermosetting compositions, or an antiozonant for rubber/rubber blends.

In carrying out the simultaneous blending and shearing in accordance with the features of the present invention, the two ethylene-propylene components undergo shearing to reduce molecular weights and molecular weight distribution (MWD), resulting in an intimate admixture exhibiting increased viscosity at ambient temperatures.

BRIEF DESCRIPTION OF THE DRAWINGS

FIGS. 1 and 2 are plots of complex viscosity as a function of temperature for different ethylene-propylene polymers and ethylene-propylene polymer blends.

DETAILED DESCRIPTION OF THE INVENTION

Figure 1:
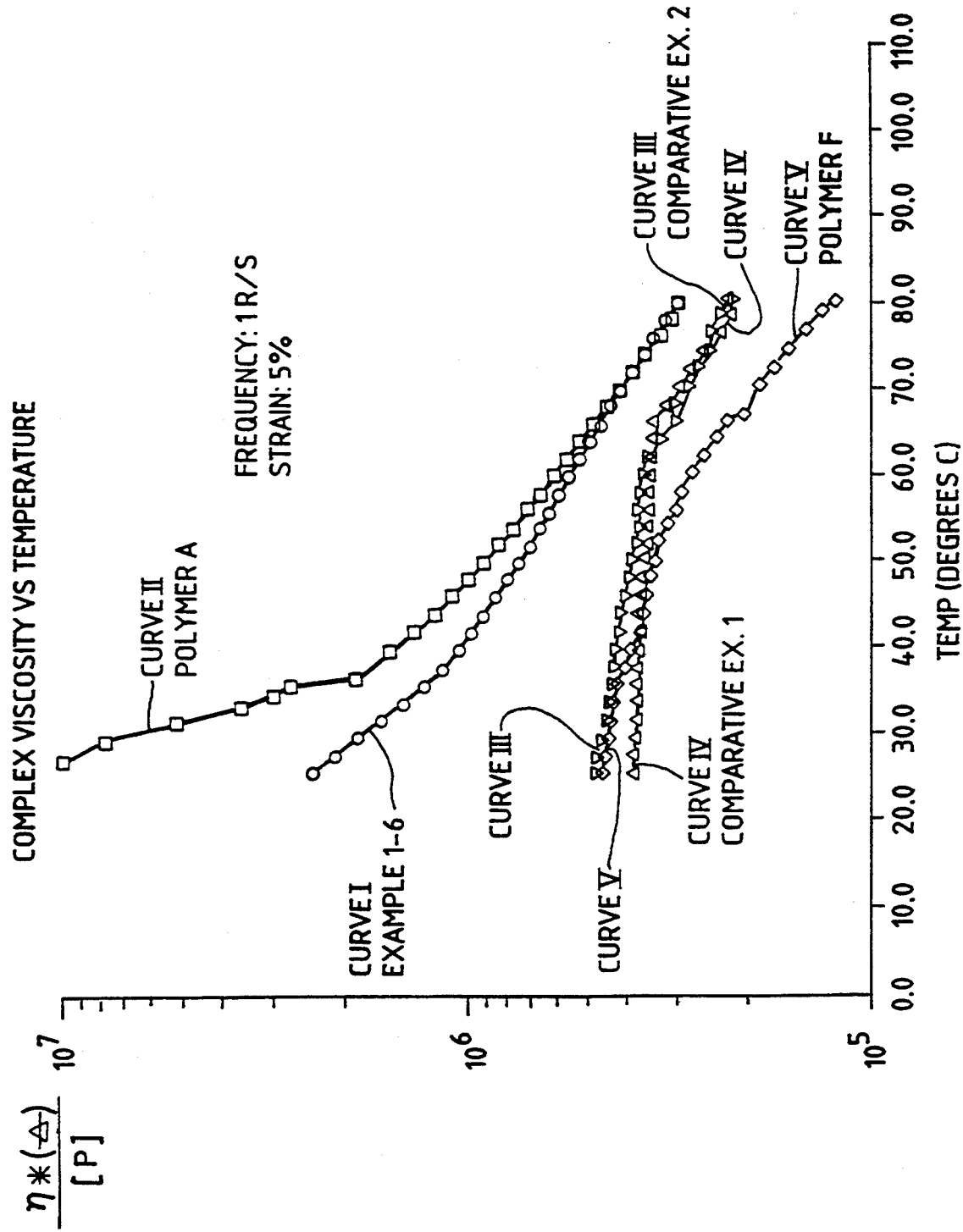

The ethylene-propylene polymers used in the practice of the present invention refer to and include ethylene-propylene copolymers or copolymers of ethylene and propylene with other alpha olefins, as well as copolymers formed by the interpolymerization of ethylene, alpha olefins and at least one other polyene monomer. Such polymers are themselves well known to those skilled in the art and are typically prepared by using conventional Ziegler-Natta polymerization techniques well known to those skilled in the art. Both types of polymers hereinafter collectively referred to as EP(D)M.

As will be appreciated by those skilled in the art, while propylene is the preferred monomer for copolymerization with ethylene and optionally a diene monomer, it will be understood that in place of propylene, use can be made of other alpha-olefins containing 4 to 12 carbon atoms. The use of such higher alpha-olefins in place of propylene are well known to those skilled in the art in Ziegler technology.

When using an interpolymer of ethylene, an alpha-olefin and a polyene monomer, use can be made of a variety of polyene monomers known to those skilled in the art containing two or more carbon-to-carbon double bonds containing 4 to 20 carbon atoms, including noncyclic polyene monomers, monocyclic polyene monomers and polycyclic polyene monomers. Representative of such compounds include 1,4-hexanediene, dicyclopentadiene, bicyclco(2,2,1)hepta-2,5-diene, commonly known as norbornadiene as well as the alkenyl norbornenes wherein the alkenyl group contains 1-20 carbon atoms and preferably 1-12 carbon atoms. Examples of some of the latter compounds includes 5-methylene-2-norbornene, 5-ethylidene-2-norbornene, vinyl norbornene as well as alkyl norbornadienes.

Also included among the ethylene-propylene polymers used in the concepts of the present invention are those EPM and EPDM polymers which have been functionalized by means of a free radical graft reaction or a graft polymerization reaction. Such grafted polymers are themselves well known to those skilled in the art. Suitable graft monomers include unsaturated dicarboxylic acid anhydrides and their corresponding acids, preferably those having the general formula:

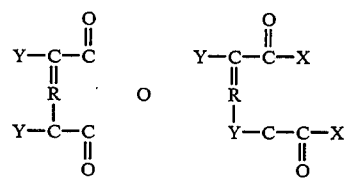

wherein R is an alkyl group having 0 to 4 carbon atoms and Y is preferably hydrogen but may also be an organic group such as a branched or straight chain alkyl group, an anhydride, a ketone group, a heterocyclic group or other organic group containing 1-12 carbon atoms. In addition, Y can be a halogen such as chlorine, bromine or iodine. X can be OH or an alkoxy group wherein the alkyl group contains 1-8 carbon atoms. Preferred among those graft monomers are maleic anhydride, itaconic anhydride.

Also suitable as the graft monomer for functionalizing an EPM or EPDM interpolymer are the derivatives of olefinically unsaturated carboxylic monomers such as, acrylic or methacrylic acid, or their esters, graft monomers which are likewise known to those skilled in the art. Typically, acrylic and methacrylic acid derivative contain 4 to 16 carbon atoms. Preferred among the acrylic and methacrylic acid graft monomers are those having the structure:

wherein $R^1$ is hydrogen or $C_1$ to $C_4$ alkyl (e.g., methyl, ethyl, etc.) and $R^2$ is selected from the group consisting of a $C_1$ to $C_8$ alkyl group, a keto functional alkyl group, an epoxy functional alkyl group, $-NH_2$ or $-NR_2$ where R can be H or $C_1$ to $C_8$ hydrocarbon and both R groups need not be the same. Particularly preferred among the group of acrylic or methacrylic graft monomers are glycidyl methacrylate, methylacrylate, methylmethacrylate, ethylmethacrylate and aminopropylmethacrylate, and acrylamide.

Another group of graft monomers which can be used to functionalize an EPM or EPDM interpolymer are vinyl amines containing 2 to 25 carbon atoms, and preferably heterocyclic vinyl amines. Such amines are themselves known as functionalizing graft monomers and include allylamines, N-vinylpyridines, N-vinylpyrrolidones, vinyl lactams, vinylcarbazoles, vinylimidazoles and vinylthiazoles as represented by 2-vinylpyridine, N-vinylpyrrolidone, vinyl caprolactam, 1-vinylimidazole, allylamine, 4-methyl-5-vinylthiazole and 9-vinylcarbazole. Such graft monomers are described in detail in U.S. Pat. No. 4,340,689, the disclosure of which is incorporated herein by reference.

As it will be appreciated by those skilled in the art, other vinyl monomers described in the prior art as suitable for functionalizing such EPM and EPDM interpolymers may likewise be used in the practice of the present invention. Examples of such further vinyl compounds are the vinyl silanes and vinylbenzyl halides as represented by vinyltrimethoxysilane, vinyldiethylchlorosilane, vinylbenzylchloride and the like. Further descriptions of suitable silane graft monomers are described in U.S. Pat. No. 4,340,689, the disclosure of which is incorporated herein by reference.

As described above, the composition of the present invention prepared by simultaneously blending and shearing utilizes, as starting materials, two different ethylene-propylene polymers, one being characterized by low ethylene content and the other being characterized by a higher ethylene content. The ethylene-propylene polymers having the low ethylene content has a polymerized ethylene/propylene molar ratio in the range of 35/65 to 65/35, and preferably a molar ratio of 50/50 to 65/35. When incorporated into a blend for use as a solid shear stable viscosity index improver, the preferred ratio of ethylene to propylene is 50/50 to 60/40. When the ethylene-propylene polymer also includes a third polyene monomer, the amount of the polyene monomer generally ranges from about 0.1 to about 10 percent, and preferably 0.2 to 5 percent by weight based on the total weight of the polymer. When, however, use is made of a preferred polyene monomer, vinyl norbornene, the most preferred range is from 0.1 to 1 percent by weight. When the ethylene-propylene monomer has been grafted with a graft monomer to functionalize the ethylene-propylene polymer, either with or without a polyene termonomer, use is preferably made of 0.1 to 6 percent by weight of the graft monomer, depending somewhat on the application of the final graft polymer.

The number average molecular weight of the low ethylene content ethylene-propylene polymer generally ranges from about 40,000 to about 250,000 as measured by GPC in trichlorobenzenes at 135° C. In the preferred practice of the present invention, the low ethylene content ethylene-propylene polymer has a molecular weight distribution within the range of about 2 to 7. As is well understood by those skilled in the art, the molecular weight distribution, often referred to as $M_w/M_n$ is determined by gel permeation chromatography according to well understood techniques, as more specifically described hereinafter.

The second component used in preparing the composition of the present invention is one having a higher ethylene content. In the preferred practice of the invention, the high ethylene content ethylene-propylene polymer has a polymerized ethylene/propylene molar ratio ranging from about 65/35 to about 85/15. When incorporated into a blend for use as a solid shear stable viscosity index improver, the preferred ratio of ethylene propylene is 70/30 to 80/20. In general the same quantities of polyene monomers and graft monomers are used in the preparation of the second, high ethylene content ethylene-propylene polymer as described above. It will be understood, however, that the composition of the higher ethylene content polymer need not employ the same combination of monomers as is used in the low ethylene content ethylene-propylene polymer. In the preferred practice of the invention, the number average molecular weight of the higher ethylene content ethylene-propylene polymer likewise ranges from about 40,000 to about 250,000 as measured by GPC in trichlorobenzene as described above. The molecular weight distribution of the high ethylene content ethylene-propylene polymer falls within the same range of about 2 to 7.

The low ethylene content ethylene-propylene polymer is, as will be understood by those skilled in the art, a random copolymer which is essentially amorphous. As is well recognized by those skilled in the art, the degree of crystallinity of a polymer is most often determined by Differential Scanning Calorimetry, or DSC. By using that standard, the low ethylene content ethylene-propylene polymer typically has less than 3 percent by weight crystallinity as determined by DSC. The higher ethylene content ethylene-propylene polymer, on the other hand, has a higher degree of crystallinity, ranging up to about 25 percent as determined by DSC. Typically, the higher ethylene content polymer has a degree of crystallinity ranging from about 6 to 20 percent as determined by DSC.

Thus, one of the features of the present invention is that the simultaneous blending and shearing of the two components employed in preparing the composition of the invention results in the blending of an essentially amorphous polymer with one that has a measurable degree of crystallinity. That represents an advantage in that the simultaneous blending and shearing results in the formation of a solid polymer having little or no tendency to exhibit cold flow so typical of OCPs previously used as viscosity index improvers and other EP(D)M's or blends thereof polymerized to a similar molecular weight.

The two components, when simultaneously blended and sheared according to the concepts of the present invention, undergo a chemical reaction by reason of the heat and energy of shearing supplied to the blend. That reaction results in a reduction in the molecular weight of the blend as well as a reduction in the molecular weight distribution of the blend. In general, good results are obtained when the number average molecular weight of the blend is controlled within the range of about 20,000 to about 150,000, as compared to the 40,000 to 250,000 number average molecular weight of the two components used in preparing the blend. The preferred number average molecular weight of the blend for use as a solid shear stable viscosity index improver is 20,000 to 75,000. The molecular weight distribution of the composition after simultaneous blending and shearing is generally within the range of about 1.5 to about 5. The desired blend molecular weight and molecular weight distribution is determined by its particular end use.

The relative proportions of the low ethylene content ethylene-propylene polymer and the higher ethylene content ethylene-propylene polymer depend, to some extent, on the application of the composition of the invention. In general, good results have been obtained when the lower ethylene content component to the higher ethylene content component has a weight ratio of 80/20 to about 50/50, and preferably 70/30 to about 60/40.

In carrying out the simultaneous blending and shearing in accordance with the concepts of the present invention, the two ethylene-propylene polymer components are contacted with each other under conditions of heat and mechanical work sufficient to create high shear conditions for a time sufficient to reduce the molecular weights and molecular weight distributions of those two components to a level desirable for the particular end use application. That operation can be carried out in a number of known types of plastic processing equipment such as single or twin screw extruders, a Banbury, as well as other mixers that have the capability of effecting the mechanical work on the components so that in the presence of an elevated temperature, reduction in the molecular weights and molecular weight distributions to the desired level is effected. The conditions of temperature, feed rate, and screw speed are determined, in part, by the molecular weight reductions desired as well as the process time desired, given the processing economics. In general, depending somewhat on the compositions of the components, processing temperatures within the range of 150° to 400° C. can be used, and preferably 175° to 320° C. The preferred embodiment makes use of a twin screw extruder.

The ethylene-propylene polymer components are generally conveniently in the form of bales which are chopped and supplied simultaneously to the extruder in which they are blended and simultaneously sheared. As will be appreciated by those skilled in the art, the components can also be supplied as either a pre-mixed bale or a pre-mixed chopped agglomerate form.

A nitrogen feed is maintained at the feed section of the extruder to minimize the introduction of air.

The ground rubber bales are fed to the twin screw extruder or other mixer along with 0.1 to 2 weight percent based on the total weight of blend polymers of an antioxidant to prevent excessive oxidation of the polymer blend during processing and storage. Choice of an antioxidant depends on the processing temperatures in the mixer as well as end use application.

The blended and sheared hot melt can generally be formed into pellets by a variety of process methods commonly practiced in the art of plastics processing. These included under water pelletization, ribbon or strand pelletization or conveyor belt cooling. When the strength of the hot melt is inadequate to form into strands, the preferred method is underwater pelletization. Temperatures during pelletization should not exceed 30° C. Optionally, a surfactant can be added to the cooling water during pelletization to prevent pellet agglomeration.

The water mixture of blended and sheared pellets can be conveyed to a dryer such as a centrifugal drier for removal of water. Pellets can be collected in a box or plastic bag at any volume for storage and shipment. Under some conditions of storage and/or shipment at ambient conditions, pellets may tend to agglomerate and stick together. These can be readily separated by mild mechanical methods to provide high surface area pellets for easy and quick dissolution into oil or blending with other materials such as rubbers and plastics.

Optionally, as end use permits, a partitioning agent, such as talc, metal stearates, and polyolefin dusts can be applied when conveying the pellets to packaging equipment to prevent agglomeration during storage.

It has been unexpectedly found in the practice of the present invention that the properties of the composition, after simultaneously blending and shearing, differ markedly with respect to either of the two components employed in preparing the blend and also differ markedly from the properties of blends prepared by other techniques. Without limiting the present invention as to theory, it is believed that it is essential in carrying out the present invention that the blending of the low ethylene content ethylene-propylene-polymer and the higher ethylene content ethylene-propylene polymer be effective such that the blending and shearing occurs simultaneously with each of the two components in the presence of each other. It has been found, for example, that different properties are obtained if the two components are separately sheared to reduce the molecular weights and molecular weight distributions and thereafter blended together. Indeed, it has even been found that the properties of the composition produced by simultaneously blending and shearing of the low ethylene content ethylene-propylene polymer and the higher ethylene content ethylene-propylene polymer differ in significant respects from blends prepared by controlling, during the polymerization reaction itself, the molecular weights of each component so that each has a molecular weight and a molecular weight distribution like that of the final blend, followed by blending the two polymers.

That effect may be illustrated by FIG. 1 which is a plot of complex viscosity as a function temperature as measured by a dynamic mechanical analyzer. As will be appreciated by those skilled in the art, it is desirable to overcome the prior art problems associated with polymer recovery, packing, and storage to maintain high levels of viscosity and/or crystallinity of the blend at ambient temperatures. The plot of FIG. 1 Curve I shows an embodiment of the present invention which is prepared by simultaneously blending and shearing a high ethylene content ethylene EPDM having a number average molecular weight of about 52,000 and a low ethylene content EPDM having a number average molecular weight of about 87,000 to a combined number average molecular weight of 35,000. As can be seen on the plot of FIG. 1, the complex viscosity rapidly increases from a relatively low level with decreasing temperature.

One of the unexpected features of the present invention may be seen by comparing Curve I, the composition of the present invention, with Curve II, for a more crystalline ethylene-propylene polymer identified as "A", a high ethylene content polymer having a number average molecular weight of about 43,000 which has not undergone any shearing. As can be seen from FIG. 1, the composition of the present invention which measures 7 weight percent crystallinity by DSC, Curve I, has a complex viscosity as a function of temperature which is very similar to that of ethylene-propylene polymer A, a polymer measuring 22 weight percent crystallinity by DSC and which is wholly unsuitable for use as a viscosity index improver because it lacks cold storage stability. When using such relatively high crystalline ethylene-propylene polymers as polymer A as a lubricating oil additive, there is a tendency for visible gel formation in the oil solution on storage. The composition of the present invention, because essentially amorphous and crystalline polymers have been intimately blended and sheared simultaneously, exhibits little or no tendency to form gels as does polymer A, while providing essentially comparable viscosity index improver characteristics with increasing temperatures.

FIG. 1 also demonstrates other wholly unexpected properties of the composition of the present invention. The same EPDM polymers used in preparing the composition of the present invention were also separately sheared, solution blended and isolated to generate Curve III. A comparison of that curve with Curve I, illustrating the composition of the present invention, shows that the complex viscosity as a function of temperature of the composition of the present invention is far superior to that of the same starting polymers which were separately sheared and then blended together. That comparison thus illustrates the importance of conducting the shearing operation in the presence of each of the two components used in making the composition of this invention.

That same effect is further demonstrated by Curve IV, a composition prepared by solution blending two EPM polymers, A and B both prepared by conventional polymerization, so that their molecular weights would be comparable to sheared polymer C (E) and sheared polymer D (F). The number average molecular weight of the blend of A plus B is approximately 38,000, essentially the same as the number average molecular weight of the composition of the present invention depicted in Curve I, the latter having a number average molecular weight of about 35,000. Curve IV resembles Curve III and further distinguishes the composition of the present invention over those obviously prepared by blending.

Compositions of the present invention, obtained by simultaneously blending and shearing in conventional plastic processing equipment provides far superior complex viscosity as a function of temperature as compared to blends at a similar molecular weight where the polymers were directly polymerized or those which were separately sheared then blended. Without limiting the invention as to theory, it is believed that the process of simultaneously blending and shearing provides an ad-mixture which develops imperfect crystallites during processing and storage but when dissolved in solution behaves more like an amorphous conventional viscosity index improver. This phenomena of increased complex viscosity as a function of temperature is not an artifact of the specific ratio of the two polymers as can be seen in FIG. 2 where Curve VII represents a 50/50 blend, Curve VIII represents a 70/30 blend, and Curve IX a 60/40 blend of polymer D and C prepared by the process of this invention. Curves V and VI represent sheared polymer D (F) and sheared C (E) each sheared independently. Curves VII, VIII, and IX like Curve I, FIG. 1 (a 65/35 blend) show a complex viscosity at ambient temperatures like that of the higher crystalline ethylene-propylene polymers. Polymer E (Curve VI) measures a DSC crystallinity of 15 weight percent.

The following examples are provided to illustrate the inventions. Materials used to demonstrate the concepts of this invention include the following:

Polymer A: an ethylene-propylene copolymer (EPM) containing 76–80 mole % ethylene with a Mn of 43,000, a MWD of 1.8, a RSV of 1.3, and a DSC crystallinity of 22 weight %, prepared by conventional polymerization.

Polymer B: an amorphous EPM containing 59 mole % ethylene with a Mn of 37,000, a MWD of 2.1, a RSV of 1.1, and no DSC crystallinity prepared by conventional polymerization.

Polymer C: an EPDM containing 78 mole % ethylene, 0.2–0.4 weight % vinyl norbornene, a Mn of 52,000, MWD of 2.9, a RSV of 2.6, and DSC crystallinity of 13.5 weight % prepared by conventional polymerization.

Polymer D: an amorphous EPDM containing 59 mole % ethylene, 0.5–0.7 weight % vinyl norbornene, a Mn of 87,000 MWD of 3.8, a RSV of 2.0, and DSC crystallinity of 0.5 weight % prepared by conventional polymerization.

Polymer E: an EPDM prepared by shearing Polymer C to a RSV of 1.3, GPC measured Mn of 34,000, a MWD of 1.9, DSC measured 15.3 weight % crystallinity, Sheared by procedure of Example 1.

Polymer F: an EPDM prepared by shearing Polymer D to an RSV of 1.0, GPC measured a Mn of 27,000, a MWD of 2.8, DSC measured 1.0 weight % crystallinity, Sheared by procedure of Example 1.

Polymer G: an amorphous EPM containing 56 mole % ethylene, Mn of 54,000, MWD of 2.3, an RSV of 1.7, prepared by conventional polymerization and solution grafted with 1.2 weight % N-vinylpyrrolidone.

The following characterization and tests were conducted on the ethylene-propylene polymers, their blends, and oil concentrates of the blends:

Crystallinity: The weight percent crystallinity was calculated from thermograms obtained by cooling conditioned melted samples over the range 180° C. to −80° C. on a Perkin-Elmer DSC-7 Differential Scanning Calorimeter.

Gel Permeation Chromatograph: Number Average Molecular Weight, Mn, and Molecular Weight Distribution was determined on polymer samples dissolved in trichlorobenzene using a Waters 150C. ALC/GPC operated at 135° C. using a universal calibration curve based on polystyrene standards ranging in molecular weight from 3000 to 3,000,000.

Kinematic Viscosity: Measured according to ASTM-D445.The Thickening Power (TP) is the difference in centistokes (cSt) between the kinematic viscosities of the dilute solution of the VI improver and the diluent oil, measured at 100° C.

Shear Stability Index: Measured according to ASTM-D3945(A) Shear Stability Index (SSI) is determined as $$SSI = \frac{Vbs - Vas}{TP} \times 100\%$$

Where

Vbs and Vas are defined as the viscosities of polymer solution before and after shearing, respectively.

TP is defined as thickening power which is determined by the difference between Vbs and the viscosity of the solvent.

The (Vbs - Vas) is viscosity loss determined according to the ASTM Method D-3945 (Proc. A).

Bench Dispersancy: A sample VI-improver being tested is blended into a formulated oil which does not contain any dispersant to make a 10 weight percent solution of the VI improver in the formulated oil. This oil solution is then tested for dispersance in the Bench Dispersancy Test. In the Bench Dispersancy Test, the dispersancy of the experimental oil is compared to that of three reference oil standards which give excellent, good, and fair results in the test. The numerical value of a test result decreases with an increase in dispersant activity. A value above 150 indicates that the sample provides no dispersancy.

Cold Storage Stability (CSS): The cold storage behavior of a motor oil containing the VI-Improvers being tested was determined by utilizing the ultra low temperature environmental chamber (Thermotron S-AC). This test allows for the determination of the stability of the formulation under cold temperature conditions. An 18-hour cold temperature cycle was employed with the temperature ranging between −60° and 4° F. The samples were examined at 10° F., after eight weeks of storage under the noted conditions. Assessment of excellent, good, poor, bad made upon visual appearance of the solution.

Pour Point (PP): Measured according to ASTM-D97.

Cold Cranking Simulator (CCS): Measured according to ASTM-D2602 (at −25° C.)

Mini-Rotoviscometer (MRV): Measured according to ASTM-D3829.

COMPARATIVE EXAMPLE 1

A blend of 65 weight % Polymer A and 35 weight % Polymer B was prepared by dissolving 65 g of A and 35 g of B in two liters of hexane. The solution was stirred overnight, then coagulated with excess isopropanol. The blend was filtered, sprayed with a solution 0.1 wt. % solution of Irganox 1076 in toluene then dried in a vacuum oven at 50° C. overnight. The recovered blend measured a Mn of 38,000, a MWD of 1.9 and a DSC crystallinity of 6.4 weight %.

COMPARATIVE EXAMPLE 2

A blend of 65 weight % Polymer E and 35 weight % Polymer F was prepared according to the procedure of Comparative Example 1. The recovered blend measured Mn of 32,000, a MWD of 2.5 and a DSC crystallinity of 7.4 weight percent.

EXAMPLE 1

Preparation of Blends at Different Ratios By Use of an Extruder to Simultaneously Blend and Shear Polymers D and C Polymers C and D were independently chopped into ¼ inch granules and fed into a Werner & Pfleiderer ZSK 30 co-rotating twin screw extruder having a length to diameter ratio (L/D) of 42. Feed rates of the polymers were controlled to yield the ratio desired. Combined feed rates of 10-20 pounds per hour were used.

The temperature profile of the extruder was maintain over the six zones in the ranges: (1) 175°-200° C., (2) 230°-290° C., (3) 250°-320° C., (4) 250°-320° C., (5) 150°-200° C., and (6) 150°-200° C. This resulted in an average melt temperature of 180°-350° C., with a torque at 45-75 for a screw speed of 200 ppm. Sheared products having the same blend ratio but different RSVs were obtained by varying the extruder barrel temperature profile over the ranges described below. The sheared melt was formed into strands and cooled in a water bath, then pelletized. Wet pellets were air oven dried at 60°-70° C. Blends were prepared at four different ratios of Polymers C and D at different barrel temperatures to vary the final blend molecular weight as measured by RSV. These are compared in Table I against comparative Polymers E and F, prepared by shearing each separately using the above procedure.

TABLE I

| 1-# | D/C Ratio | Avg. Barrel Temp, °C. | Sheared RSV | Comments |
|---|---|---|---|---|
| 1 | (100/0)$^a$ | 227 | 1.00 | Comparative Polymer F (Sheared Polymer D) |
| 2 | 70/30 | 235 | 1.0 | |
| 3 | 70/30 | 212 | 1.2 | |
| 4 | 70/30 | 208 | 1.2 | |
| 5 | 65/35 | 226 | 0.9 | |
| 6 | 65/35 | 217 | 1.1 | |
| 7 | 65/35 | 218 | 1.2 | |
| 8 | 65/35 | 216 | 1.3 | |
| 9 | 60/40 | 231 | 0.9 | |
| 10 | 60/40 | 224 | 1.0 | |
| 11 | 60/40 | 215 | 1.1 | |
| 12 | 60/40 | 207 | 1.2 | |
| 13 | 50/50 | 219 | 1.2 | |
| 14 | (0/100)$^a$ | 257 | 1.3 | Comparative Polymer E (Sheared PolMer C) |

$^a$See comments.

EXAMPLE 2

Preparation of Oil Solutions and Tests as a Viscosity Index Improver

The polymers and polymer blends prepared in Example 1 and 2 were dissolved in a solvent neutral oil having an SUS at 100° F. of 100 by heating at 212°-320° F. under nitrogen in a glass reactor with mechanical stirring. The concentrate was then diluted with a pour depressed solvent neutral oil having an SUS at 100° F. of 130 to form an oil solution having a kinematic viscosity of about 11.5 cSt. The oil solutions were tested according to ASTM methods as described above. The results are summarized in Table II.

TABLE II

| 2-# | RSV | TP (cst) | SSI (%) | CCS (cP) | MRV (cP) | PP | CSS[1] |
|---|---|---|---|---|---|---|---|
| 1 | 1.00 | 6.8 | 24 | 3950 | 32,850 | −36 | Good |
| 2 | 1.0 | 6.6 | 22 | 3650 | 16,200 | −30 | Good |
| 3 | 1.2 | 6.4 | 22 | 3650 | 16,100 | −30 | Good |
| 4 | 1.2 | 6.5 | 23 | 3600 | 14,700 | −30 | Good |
| 5 | 0.9 | 6.6 | 16 | 3800 | 15,100 | −30 | Good |
| 6 | 1.1 | 6.5 | 22 | 3500 | 20,500 | −30 | Good |
| 7 | 1.2 | 6.5 | 27 | 3550 | 13,800 | −33 | Good |
| 8 | 1.3 | 6.4 | 30 | 3300 | 14,200 | −33 | Good |
| 9 | 0.9 | 6.5 | 18 | 3700 | 14,300 | −30 | Good |
| 10 | 1.0 | 6.6 | 21 | 3350 | 15,600 | −30 | Good |
| 11 | 1.1 | 6.6 | 26 | 3450 | 14,800 | −33 | Good |
| 12 | 1.2 | 6.8 | 30 | 3450 | 15,000 | −30 | Good |
| 13 | 1.2 | 6.5 | 22 | 3450 | 11,200 | −30 | Good |
| 14 | 1.3 | 6.4 | 20 | 3000 | 16,700 | −18 | Bad |

[1]Good means no gel formation on storage at low temperature. Bad means gel formed during storage at low temperature after 2 weeks.

EXAMPLE 3

Simultaneously Blending and Shearing Varying Extruder Conditions

Blends of 65 weight % D and 35 weight % C were prepared on a Werner & Pfleiderer ZSK-58 counter rotating twin screw extruder to examine the effect of screw speed and design on blend molecular weight, measured as a RSV, and oil solution properties, Thickening Power and Shear Stability Index. The following procedure was followed.

Polymers C and D were independently chopped into ¼ inch granules and charged separately to two loss weight feeders for metering into the extruder. Feed rates of the polymers were controlled to yield the ratio desired for end use properties. Combined feed rates of 100 to 150 kg per hour were used. Extruder L/D was varied over the range 24–45. Nitrogen was also fed to the feed section to minimize the introduction of air into the extruder. An additional feed of 0.2 weight % based on the total feed rate of C and D of Western 618F1 was metered to the feed section of the extruder with a volumetric screw feeder.

The temperature of the extruder was maintain to produce an average melt temperature of 230°–314° C. Screw speed was varied over the range 180 to 400 RPM. Venting of the extruder was accomplished through a vent stuffer so that volatile material could be removed and foaming of the melt avoided. Melt pelletization process was employed using water temperature of 10° C. to 30° C. Wet pellets were charged to a centrifugal drier operated at ambient temperature.

Procedure Example 2 was followed for preparation of the oil solutions. Results are summarized in Table III.

TABLE III

| 3-# | Combined Feed Rate kg/hr | Extruder L/D | RPM | Avg. Barrel Temp. °C. | Screw Design[a] | RSV | TP cSt | SSI (%) |
|---|---|---|---|---|---|---|---|---|
| 1 | 100 | 24 | 200 | 233 | 1 | 1.7 | 14 | 42 |
| 2 | 100 | 24 | 300 | 259 | 1 | 1.1 | 7.6 | 19 |
| 3 | 100 | 24 | 400 | 230 | 1 | 1.6 | 11.7 | 37 |
| 4 | 150 | 45 | 300 | 275 | 2 | 1.1 | 7.1 | 18 |
| 5 | 120 | 45 | 210 | 314 | 2 | 1.2 | 8.3 | 24 |
| 6 | 140 | 45 | 300 | 296 | 2 | 1.1 | 6.6 | 21 |
| 7 | 120 | 32 | 180 | 310 | 3 | 1.1 | 6.8 | 23 |

[a]1 provides mild shearing; 2 provides intermediate shearing; 3 provides intense shearing.

These examples demonstrate that the feed blend RSV can be significantly decreased (RSV of combined feed to the extruder was 2.2) to yield a blend with target properties for use as a viscosity index improver, regardless of screw design by optimizing the barrel temperature and screw speed. Examples 3-1 and 3—3 did not reach a reduction in molecular weight adequate to achieve the desired SSI of 23%.

EXAMPLE 4

Blends were prepared according to the procedure of Example 1 of Polymer G, a derivatized ethylene-propylene copolymer typically referred to as a DOCP when used as a viscosity index improver, and Polymer C. Blends were prepared at 80/20, 60/40 and 50/50 weight ratio of Polymer G to Polymer C and tested as a viscosity index improver in comparison with Polymer G alone. Results are summarized in Table IV.

TABLE IV

| 4-# | Blend Ratio | Blend RSV | TP (cSt) | SSI (%) | Bench Dispersancy |
|---|---|---|---|---|---|
| 4-1 | 60/40 | 1.2 | 6.6 | 26 | 110 |
| 4-2 | 50/50 | 1.1 | 6.7 | 15 | 150 |
| 4-3 | 80/20 | 1.1 | 6.6 | 21 | 80 |
| 4-4 | 100/0 | 0.9 | 6.8 | 20 | 65 |

What is claimed is:

1. A process for producing an ethylene-propylene polymer blend having a number average molecular weight within the range of about 20,000 to about 150,000 and a molecular weight distribution within the range of about 1.5 to about 5 comprising simultaneously in the absence of solvent blending and shearing:
   (a) an essentially amorphous low ethylene content ethylene-propylene polymer containing an ethylene to propylene mole ratio within the range of 35/65 to 65/35, having a number average molecular weight within the range of about 40,000 to about 250,000 and a molecular weight distribution within the range of about 2 to 7;
   (b) a partially crystalline higher ethylene content ethylene-propylene polymer containing an ethylene to propylene molar ratio within the range of about 65/35 to about 85/15, having a number average molecular weight within the range of about 40,000 to about 250,000 and a molecular weight distribution within the range of about 2 to 7;
   whereby the blending and shearing is carried out under conditions of heat and mechanical work sufficient to create high shear conditions for a time sufficient to reduce the molecular weight and molecular weight distribution of the blend of (a) and (b), wherein the weight ratio of low ethylene content ethylenepropylene polymer (a) to the higher ethylene-propylene polymer (b) is within the range of about 80/20 to about 50/50.

2. A process as defined in claim 1 wherein the low ethylene content ethylene-propylene polymer contains less than 3 percent by weight crystallinity.

3. A process as defined in claim 1 wherein the higher ethylene content ethylene-propylene polymer has a degree of crystallinity of no greater than 25 percent.

4. A process as defined in claim 1 wherein at least one of the low ethylene content ethylene-propylene polymer and the higher ethylene content ethylene-propylene polymer includes a polyene monomer copolymerized therewith containing two or more carbon to carbon double bonds and containing 4–20 carbon atoms.

5. A process as defined in claim 4 wherein the polyene is selected from the group consisting of noncyclic polyene monomers, monocyclic polyene monomers and polycyclic polyene monomers.

6. A process as defined in claim 4 wherein the polyene monomer is selected from the group consisting of 1,4-hexanediene, dicyclopentadiene, norbornadiene, 5-methylene-2-norbornene, 5-ethylidene-2-norbornene, vinyl norbornene and the alkyl norbornadienes.

7. A process as defined in claim 1 wherein at least one of the low ethylene content ethylene-propylene polymer and the higher ethylene content ethylene-propylene polymer has been functionalized by means of a graft polymerization.

8. A process as defined in claim 7 wherein the graft monomer is selected from the group consisting of unsaturated dicarboxylic acid anhydrides and their corresponding acids or diesters.

9. A process as defined in claim 7 wherein the graft monomer is maleic anhydride.

10. A process as defined in claim 7 wherein the graft monomer is a derivative of acrylic or methacrylic acid containing 4–16 carbon atoms.

11. A process as defined in claim 7 wherein the graft monomer is selected from the group consisting of glycidyl methacrylate, methyl acrylate, methylmethacrylate, ethylmethacrylate and aminopropylmethacrylate.

12. A process as defined in claim 7 wherein the graft monomer is a vinyl amine containing 2–25 carbon atoms.

13. A process as defined in claim 12 wherein the vinyl amine is selected from the group consisting of allylamines, N-vinylpyridines, N-vinylpyrrolidones, vinylcarbazoles, vinylimidazole and vinylthiazoles.

14. A process as defined in claim 7 wherein the graft monomer is selected from the group consisting of vinyl silanes and vinylbenzyl halides.

15. A process as defined in claim 4 wherein the polyene is present within the range of about 0.1 to about 10 percent based on the total weight of the polymer.

16. A process as defined in claim 4 wherein the graft monomer is present in an amount within the range of 0.1 to 6 percent based on the total weight of the polymer.

17. A process as defined in claim 1 wherein the simultaneous blending and shearing is carried out at a processing temperature within the range of 150° to 350° C.

18. A process as defined in claim 1 wherein the simultaneous blending and shearing is carried out in a mixer having the capability of effecting mechanical work to reduce the molecular weight and the molecular weight distributions.

* * * * *

UNITED STATES PATENT AND TRADEMARK OFFICE
CERTIFICATE OF CORRECTION

PATENT NO. : 5,451,636  
DATED : September 19, 1995  
INVENTOR(S) : Olivier, et al.

Page 1 of 2

It is certified that error appears in the above-indentified patent and that said Letters Patent is hereby corrected as shown below:

In column 4, lines 54-60, delete the formulas shown and insert therefor the following:

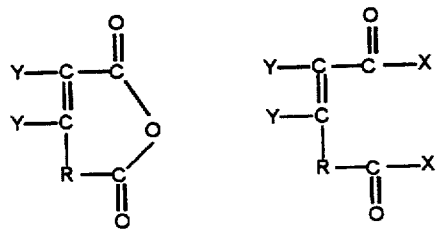

In column 11, line 53, delete "Polymer A" and insert therefor --Polymer B--.

In column 11, line 54, delete "Polymer B" and insert therefor --Polymer A--.

In column 11, line 54, delete "A" and insert therefor --B--.

In column 11, line 55, delete "B" and insert therefor --A--.

In column 11, line 64, delete "Polymer E" and insert therefor --Polymer F--.

UNITED STATES PATENT AND TRADEMARK OFFICE
CERTIFICATE OF CORRECTION

PATENT NO. : 5,451,636
DATED : September 19, 1995
INVENTOR(S) : Olivier, et al.

It is certified that error appears in the above-indentified patent and that said Letters Patent is hereby corrected as shown below:

In column 11, line 65, delete "Polymer F" and insert therefor --Polymer E--.

Signed and Sealed this

Eleventh Day of June, 1996

Attest:

BRUCE LEHMAN

*Attesting Officer*      Commissioner of Patents and Trademarks